United States Patent Office 3,770,851
Patented Nov. 6, 1973

3,770,851
TERPOLYMER LATICES BASED ON VINYL ETHER/VINYL CHLORIDE COPOLYMERS GRAFTED WITH ACRYLATE ESTERS
Nathan D. Field, Allentown, and Wiley Edgar Daniels, Easton, Pa., assignors to GAF Corporation, New York, N.Y.
No Drawing. Filed Mar. 30, 1971, Ser. No. 129,641
Int. Cl. C08f 15/40
U.S. Cl. 260—884                         11 Claims

ABSTRACT OF THE DISCLOSURE

Novel terpolymer latices are disclosed which are grafted terpolymers in which poly (alkyl acrylate) or poly (alkylmethacrylate) chain segments are pendant from a backbone composed of a copolymer of vinyl chloride and alkyl vinyl ethers. Certain of these terpolymers have been found to form clear, strong films useful for coatings upon substrates such as wood, glass, metal, paper, etc. Other latices within the scope of the invention which are not film forming have been found to be excellent processing aids for polyvinyl chloride extrusion and casting. A method is disclosed for preparing these terpolymers.

FIELD OF THE INVENTION

This application relates to terpolymer latices and more particularly to graft terpolymers in which poly (alkyl acrylate) or poly (alkylmethacrylate) chain segments are pendant from a backbone of a copolymer of vinyl chlorides and alkyl vinyl ethers.

PRIOR ART

The emulsion copolymerization of alkyl vinyl ethers with vinyl chloride is well known in the polymer art. Details of uses and the manufacture of such copolymers have been reported by C. E. Schildknecht in his book, "Vinyl and Related Polymers," published by John Wiley & Sons, Inc., New York (1952); and in PB report 485, J. G. Kern (1945). Much is devoted in these publications to the emulsion copolymerization of isobutyl vinyl ether and vinyl chloride. A surfactant of the alkyl sulfonate type is used, usually a sodium salt of lauryl sulfonic acid, and the mixture is buffered to a pH near 7, and 0.1 to 0.3% of potassium persulfate is added as a reaction initiator. Further references are devoted to these techniques, including M. F. Shostakovskii, et al., Jhournal prik. Khim. 28 (1955), pp. 1123–1127. This latter journal article describes a low-temperature, high-pressure polymerization also in the presence of sodium alkyl sulfonate surfactant. As mentioned, the technology concerning these copolymers has been well developed. However, many films formed from such copolymers leave much to be desired with regard to transparency.

STATEMENT OF THE INVENTION

We have found that by preparing terpolymers which may be envisioned as having the formula:

$$\left[ \begin{array}{c} -CH_2-CH- \\ | \\ Cl \end{array} \right]_x \left[ \begin{array}{c} -CH_2-CH- \\ | \\ OR \end{array} \right]_y$$

$$\left[ \begin{array}{c} -CH_2-CR'- \\ | \\ C=O \\ | \\ OR'' \end{array} \right]_z$$

wherein the broken line represents attachment at random points along the backbone copolymer, wherein R may be an alkyl having 1 to 18 carbon atoms or a hydroxy functional alkyl (such as hydroxymethyl, hydroxyethyl, etc.), R' may be hydrogen or methyl, and R'' again may be alkyl or hydroxy functional alkyl of 1 to 18 carbon atoms. In the backbone copolymer, $x$ may be varied from 50 to 99% by weight of said backbone copolymer and $y$ may be varied from 1 to 50% by weight of said backbone copolymer. In the pendant acrylate moiety, $z$ may be varied from about 5 to 90% by weight of the whole polymer.

As can be seen from the above representation of the terpolymer, it consists of grafted terpolymers in which the poly (alkyl acrylate) or poly (alkyl methacrylate) chain segments of the general structure:

$$\left[ \begin{array}{c} -CH_2-CR'- \\ | \\ C=O \\ | \\ R'' \end{array} \right]_z$$

are randomly distributed and are pendant from a backbone copolymer composed of a copolymer of vinyl chloride and alkyl vinyl ethers of the general formula:

$$\left[ \begin{array}{c} -CH_2-CH- \\ | \\ Cl \end{array} \right]_x \left[ \begin{array}{c} -CH_2-CH- \\ | \\ O-R \end{array} \right]_y$$

R, R', R'', $x$, $y$, and $z$ are as set forth above.

The novel terpolymers of the present invention are prepared by adding to an aqueous latex of a vinyl ether/vinyl chloride copolymer of about 20–50% solids content, an aqueous emulsion of the alkyl acrylate or methacrylate to which has been added an alkali metal salt of a "peracid" such as sodium persulfate as an initiator.

The graft copolymerization of the acrylate onto the copolymer is achieved by the simple procedure of raising the temperature of the mixture to about 80° C. At that temperature, the grafting copolymerization reaction is well underway. The resultant graft terpolymer when cooled is then ready for use.

The alkyl vinyl ether utilized for the copolymerization with vinyl chloride may consist of individual alkyl vinyl ethers of carbon contents of 1 to 18 or may consist of mixtures of such vinyl ethers. As the proportions of alkyl vinyl ether to vinyl chloride varies, so may the exact positioning of each moiety within the backbone polymer be varied. Among the akyl vinyl ethers suitable for the formation of the copolymer for the backbone of the novel terpolymer of the present invention there may be mentioned:

methyl vinyl ether
ethyl vinyl ether
n-propyl vinyl ether
isopropyl vinyl ether
n-butyl vinyl ether
isobutyl vinyl ether
t-butyl vinyl ether
n-amyl vinyl ether
isoamyl vinyl ether
t-amyl vinyl ether
n-hexyl vinyl ether
n-heptyl vinyl ether
n-octyl vinyl ether
isooctyl vinyl ether
2-ethylhexyl vinyl ether
decyl vinyl ether
dodecyl vinyl ether (lauryl vinyl ether)
tetradecyl vinyl ether
hexadecyl vinyl ether (cetyl vinyl ether)
octadecyl vinyl ether Suitable mixtures which may form in copolymeric units within the vinyl chloride/poly (alkyl vinyl ether) backbone polymer can be prepared from mixtures of methyl vinyl ether and 2-ethylhexyl vinyl ether; and also of ethyl vinyl ether/cetyl vinyl ether. The preferred vinyl ether for the copolymer of the backbone with vinyl chloride is isobutyl vinyl ether. A useful mixture containing about 30 weight percent of isobutyl vinyl ether and 70 weight percent vinyl chloride is dissolved in U.S. patent application, Ser. No. 594,651, filed Nov. 16, 1966 and streamlined U.S. patent application, Ser. No. 62,134, filed Aug. 7, 1970. It has been found that the latex of the isobutyl vinyl ether/vinyl chloride copolymer of about 30 weight percent isobutyl vinyl ether content yields the clearest films when prepared into the terpolymer of the present invention.

In place of the alkyl vinyl ethers there may be used the hydroxy group-containing vinyl monomers such as the ω-hydroxy alkyl vinyl ethers of 1 to 18 carbon atoms. The following compounds are illustrative of hydroxyl group-containing monomers; hydroxyethyl vinyl ether; 2-hydroxy-n-propyl vinyl ether; 4-hydroxybutyl vinyl ether; 3-hydroxypropyl vinyl ether; 6-hydroxyhexyl vinyl ether and the like. Preferred are the ω-hydroxy alkyl vinyl ethers prepared by the mixture of acetylene and a ω-dihydroxy alkanes (α,ω-alkylene glycols).

While vinyl chloride is the other primary component of the backbone polymer, it may be replaced by vinyl bromide or iodide if necessary or desirable. With regard to the poly(alkyl acrylates) or poly(alkyl methacrylates) useful for forming the pendant moieties from the poly (vinyl chloride/polyvinyl ether) backbone, the alkyl acrylate monomers which are used for this grafted chain may be described by the following structural formula:

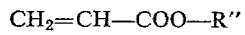

$$CH_2=CH-COO-R''$$

wherein R'' represents a straight or branched-chain alkyl radical. Particularly valuable alkyl acrylates are those wherein R'' has from 1 to 7 carbon atoms. Especially preferred monomers useful for preparing the grafted portion of the terpolymer of this invention falling within the above-defined group are methyl acrylate, ethyl acrylate, and n-butyl acrylate. These materials are readily available and relatively inexpensive. The alkyl methacrylate monomers for the grafted portion of the terpolymer of this invention may be described by the following formula:

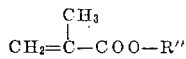

$$CH_2=\underset{\underset{\displaystyle}{|}}{\overset{\displaystyle CH_3}{C}}-COO-R''$$

wherein R'' is an alkyl group as defined above. Preferred compounds for this monomer are those where R'' is methyl, ethyl and n-propyl. Particularly preferred is methyl methacrylate as this compound is readily available and by using this monomer as an intermediate excellent films are obtained.

The terpolymer of this invention is prepared by forming an aqueous latex of the vinyl ether/vinyl chloride copolymer containing up to about 50% solids and graft polymerizing the alkyl acrylate or alkyl methacrylate moiety thereon by adding an emulsion of the latter to the aqueous latex. It is preferred to add a conventional amount of a polymerization initiator to the emulsion of the acrylate moiety. The initiators employed in connection with the present invention include the common organic free-radical initiators such as tertiary-butyl peroxypivalate, di-t-butyl peroxide, diisobutyl peroxide, benzoyl peroxide, lauryl peroxide, organic azo-compounds such as α-azodiisobutynonitrile and the like. Other free radical-generating catalyst systems include the alkali metal persulfates such as potassium and sodium persulfate and other salts of per-acids which will also act as initiators. Preferred in this particular reaction is potassium persulfate. It is to be noted however, that the catalyst should preferably be a low-temperature initiator which will furnish free-radicals in sufficient quantities at temperatures between about 50 to about 80° C. to facilitate the reaction within useful times. The catalyst is used in a concentration sufficient to effect a substantially complete polymerization at a suitable reaction rate. In this regard, the presence of an excess of catalyst does not have a detrimental effect on the end product. However, such an excess should be controlled for economic reasons. Generally, the catalysts are employed in concentrations up to about 1% by weight of the acrylate monomer.

In practice, the emulsion of the alkyl acrylate containing the potassium persulfate initiator is added to the aqueous latex of vinyl ether/vinyl chloride copolymer and the graft polymerization of the acrylate unto the copolymer is then initiated by raising the temperature of the mixture about 50° C. and preferably up to about 80° C. The exotherm should preferably be controlled and the reaction mixture maintained at temperatures below the boiling point of water in order to prevent coagulation of the latex. When the exotherm subsides, the reaction is substantially completed.

It is preferred to conduct a polymerization at pH's above neutrality, i.e., a pH of over about 7. In general, a pH of about 11.5 has proven satisfactory. In order to maintain this pH range, it is conventional to employ the commonly used buffers such as disodium hydrogen phosphate or the like. Initially, the pH of the emulsions and latexes can be raised to the proper level by the use of sodium hydroxide or the like.

Other ingredients commonly used in emulsion or suspension polymerization systems may also be included. Such ingredients include, for example, a surfactant such as sodium lauryl sulfate, defoaming agents such as silicones, etc.

It will be appreciated by one skilled in the art, that the conditions herein referred to may be varied from a particular suggested optimum figure either because the success of the process does not depend upon the maintenance of the condition with such exactitude or because the alteration of a particular condition may be compensated for by the alteration of another concurrently operating condition.

As stated above, while many graft terpolymers may thus be prepared within the range of proportions set forth, those graft terpolymers prepared from about 30% alkyl vinyl ether/70% vinyl chloride copolymers grafted with about 30 parts by weight of a $C_4$ alkyl acrylate such as n-butyl acrylate have been found to be particularly useful in that their latices formed clear, strong films on drying at room temperature or below and thus are useful in the coating of many substrates including wood, glass, metal or paper.

The resultant novel latex of the terpolymer prepared according to this invention, when prepared according to those proportions which are stated to yield flexible films can provide such films by being coated onto substrates and then air drying the latex until the film is formed. The films are generally clear, strong and flexible.

Generally, the films formed by the copolymers of alkyl vinyl ethers with vinyl chloride, without the grafting of the acrylate moiety, are discontinuous and upon aging will tend to spoil and eventually degrade to form chalk-like dust.

It is also possible to prepare terpolymer latices according to this invention which do not form films at room temperature. These novel latices contain terpolymers of minor proportions of the alkyl methacrylates grafted onto the vinyl chloride/vinyl ether copolymers; e.g., methyl methacrylate 10% on a vinyl ether/vinyl chloride copolymer 90%. The terpolymers resulting from such non-film forming latices have been found to be excellent processing aids for PVC manufacture and serve the purpose of improving the processability of polyvinyl chloride in the mobile state.

This improvement may involve one or more of the processing characteristics of the plastic material. The improvement in the processability leads to either a decrease in manufacturing costs, an improvement in product quality or a combination of both. Among such improved processing results are a reduction in the mechanical power requirement of the extrusion process. The further processing improvement may reside in the higher productivity per unit of equipment. Other important criteria for processing aids are the fact that despite their altering the requirements for the processing of the material, they should not affect in any deleterious manner the key inherent physical properties of the polymer whose processing they improve. The terpolymers of this invention have been found to be excellent processing aids for polyvinyl chloride.

With regard to the film-forming latices, they have a $T_g$ (glass transition temperature) of less than room temperature, whereas the vinyl ether/vinyl chloride latexes alone do not have such a low $T_g$. In general, the $T_g$ of the latices vary with the structure of the vinyl ether and its concentration, but in the main a $T_g$ of 45° C. or higher is a common characteristic of the copolymers of vinyl ether/vinyl chloride.

For film-forming, the copolymer latex of major importance is the isobutyl vinyl ether/vinyl chloride copolymer containing 30% by weight of isobutyl vinyl ether. This copolymer when grafted according to this invention, with 20% or more of the acrylate moiety, either methyl methacrylate or methyl acrylate, provides a terpolymer of excellent film-forming capabilities.

The invention will now be described by reference to the appended examples. All parts are by weight unless otherwise specified.

EXAMPLE 1

Into a 500 ml. round bottomed flask equipped with thermometer, reflux condenser, and paddle agitator was charged an emulsion consisting of 50 ml. n-butyl acrylate (Rohm & Haas low-inhibitor grade), 50 ml. water, 0.2 g. $K_2S_2O_8$ and 0.5 g. sodium lauryl sulfate (Stepanol WA 100). To this monomer emulsion (at room temperature) was added 100 ml. of isobutyl vinyl ether/vinyl chloride copolymer latex 50.8% solids, pH 10.3. The mixture was then stirred and heated to 78° C. with a hot water bath. An exotherm to 94° C. resulted. After one-half hour, the reaction mixture was cooled to room temperature and filtered through three-fold cheesecloth. No precoagulum was observed. The final product contained less than 1.0% residual monomer and 49.9% total solids. The latex (demonstrating blue-white light scattering) deposited a very clear, strong and flexible film upon air drying. The grafted product contained 50% N-butyl acrylate and 50% isobutyl vinyl ether/vinyl chloride copolymer. The original isobutyl vinyl ether/vinyl chloride latex dried to a dusty, chalk-like, discontinuous film.

EXAMPLE 2

The procedure of Example 1 was repeated, using in place of the isobutyl vinyl ether/vinyl chloride copolymer latex, 100 ml. of 2-ethylhexyl vinyl ether/vinyl chloride copolymer latex. This latex contained 46% solids, pH 11.0. The original copolymer contained 75% vinyl chloride and 25% 2-ethylhexyl vinyl ether moieties. Its $\eta$ rel (1.0 w./v. percent toluene) was 1.72. To this was added an emulsion of 10 g. n-butyl acrylate and 10 g. $H_2O$ with 0.1 g. $K_2S_2O_8$ and 0.1 g. sodium lauryl sulfate (Stepanol WA 100).

The resultant grafted terpolymer latex (52% solids) deposited very clear and highly extensible films at room temperature. These films were much more extensible than the films from the graft latex of Example 1. The grafted terpolymer contained 80% 2-ethylhexyl vinyl ether/vinyl chloride copolymer and 20% grafted n-butyl acrylate moieties.

EXAMPLE 3

The experiment of Example 2 was repeated except that only 10% by weight of (5.0 g.) n-butyl acrylate was used as the grafting monomer, based on 2-ethylhexyl vinyl ether/vinyl chloride copolymer weight. The resulting latex was not a room temperature film former.

EXAMPLE 4

This experiment illustrates that poly(vinyl chloride) acrylate grafts are not as compatible as poly co(vinyl ether/vinyl chloride) acrylate grafts.

The experiments of Example 1 was repeated using a poly(vinyl chloride) (PVC) latex (50% solids). The resulting 50/50 graft copolymer latex deposited films at room temperature, but the resulting films were opaque (blue-white), and dried to a dumbell shape, in contrast to the optically clear film of Example 1 which retained nearly all of its dimensional shape upon drying. The PVC/acrylate graft film had little tensile strength and was not as extensible as the poly(isobutyl vinyl ether/vinyl chloride) acrylate graft film of Example 1.

EXAMPLE 5

An aqueous phase consisting of 265.0 g. $H_2O$ (distilled), 50.0 g. sodium lauryl sulfate (Stepanol WAC), 4.0 g. $Na_2HPO_4$, 2.5 g. 50% NaOH, and 0.2 g. $Na_2S_2O_8$ was prepared and heated to 65–70° C. for two hours while passing a slow stream of $N_2$ therethrough. After cooling and adding makeup water, 3.0 g. $Na_2S_2O_8$ was added, and the solution charged to a 1-liter Magnadrive autoclave. After purging by three times evacuating and then filling with $N_2$, Phase B, 90.0 g. isobutyl vinyl ether and 90.0 g. vinyl chloride was added and the temperature raised to 30° C. An initial pressure of 27 p.s.i. was observed, which dropped to 16 p.s.i. after five hours. Then, 30.0 g. vinyl chloride was added and reacted for two hours (pressure 40 to 19 p.s.i.).

Another 30.0 g. portion of vinyl chloride was added and reacted for two hours (pressure 38 to 22 p.s.i.). A third portion of vinyl chloride, 30.0 g. was added, and reacted for two hours (pressure 38–21 p.s.i.). Finally, a last portion of vinyl chloride, 30.0 g. was added, and the reaction continued until a total time of 24 hours had elapsed at which point the pressure was 18 p.s.i. A sample at this time indicated pH 9.2, solids 45.8, and 89.5% conversion. At this point, an emulsion of 90.0 g. n-butyl acrylate (Rohm & Haas low inhibitor), 90 g. $H_2O$, 4.0 g. Emulphor ON–870 and 0.5 g. $Na_2S_2O_8$ was added and the temperature raised to 80° C.; after another two hours, the final pressure was 40.0 p.s.i. (mainly $N_2$). The discharged latex was free of precoagulum, contained 50% solids (98% conversion) and had a pH of 3.1. The latex deposited a clear film at room temperature, which became quite strong after heating to 130° C./5 min.

A portion of the latex was coagulated into methanol and the polymer was water-washed and vacuum dried. The $\eta$ rel. (1.0 w./v. percent toluene) of the product was 1.54. Tensile data on latex cast films and isolated copolymer films was gathered:

| | Tensile strength, p.s.i. | Elong., percent |
|---|---|---|
| Cast neutralized latex (6 mils) | 1,220 | 255 |
| Carver pressed polymer (after isolation by coagulation) | 1,850 | 223 |

EXAMPLE 6

The procedure and recipe of Example 5 was repeated at a fifteen fold scale-up factor. The reaction was carried out in a five-gallon, stainless steel reactor equipped with Dispersimax stirrer agitation, and provided with a blowleg for sampling. The following data was obtained by sampling throughout the course of the reaction and illustrates the entire procedure.

| Time, hours | Temp. | Conversion, percent | Monomers added |
|---|---|---|---|
| 0 | 30 | 0 | IBVE/VC 1:1 (isobutyl vinyl ether/vinyl chloride). |
| 5 | 30 | 63 | VC increment No. 1. |
| 7 | 30 | 68 | VC increment No. 2. |
| 9 | 30 | 84 | VC increment No. 3. |
| 11 | 30 | 93 | VC increment No. 4. |
| 28 | 30 | 98 | Butyl acrylate added. |
| 30 | 80 | 100 | |

The latex was then cooled to room temperature and discharged. Latex properties were:

pH—4.6
Solids—52.3
Minimum film forming temperature: 18° C.
Residue monomer: 0.5%
Film tensile strength: 1170 p.s.i.
Film elongation: 260%

The copolymer contained 52.1% PVC (by chlorine content) and had a relative viscosity of 1.9 in toluene solution (1.0 g./100 cc.).

EXAMPLE 7

The experiment of Example 3 was repeated using in place of n-butyl acrylate, n-butyl methacrylate as the grafting monomer.

The resulting latex did not form films at room temperature, but upon coagulation with excess methanol and subsequent water washing of the terpolymer yielded a fine powdery terpolymer of ca. 10% poly (n-butyl methacrylate) 90% (2-ethylhexyl vinyl ether)/vinyl chloride terpolymer. This product ($\eta$ rel. 1.0 w./v. percent in THF of 2.3) was found to promote the processability of polyvinyl chloride (PVC) at a level of additive to PVC of 5 phr., as determined by the Brabender Plastograph.

What is claimed is:
1. A film forming random graft terpolymer of
   (a) vinyl chloride and
   (b) an alkyl vinyl ether,
(a) and (b) being in random copolymer backbone form and having grafted thereon as pendant chains
   (c) poly(alkyl acrylated) chain segments, said terpolymer having a $T_g$ of less than room temperature, said copolymer having a $T_g$ of greater than room temperature.
2. A terpolymer according to claim 1 having the structural formula:

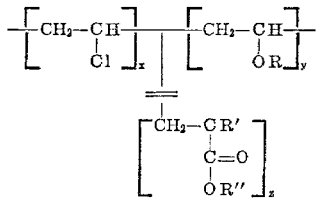

wherein R is an alkyl or hydroxy functional alkyl of 1 to 18 carbon atoms, R' is hydrogen and R" is an alkyl or hydroxy functional alkyl of 1 to 18 carbon atoms and $x$ may be varied from about 50 to 99% by weight of the backbone copolymer and $y$ may be varied from 1 to 50% by weight of said backbone copolymer and $z$ may be varied from about 5 to 90% by weight of the entire terpolymer.

3. The terpolymer according to claim 2 wherein $x$ is about 70% of said backbone copolymer by weight, and $y$ is about 30% of said backbone copolymer by weight, and $z$ represents about 20 to 50 parts per weight of the entire terpolymer, with R" being an alkyl group.

4. The graft terpolymer according to claim 1 wherein the backbone copolymer comprises about 30% by weight of 4 to 8 carbon alkyl vinyl ether and 70% by weight of vinyl chloride and the pendant graft comprises 30 parts by weight of the terpolymer of a 4 carbon alkyl acrylate.

5. The graft terpolymer according to claim 4 having a backbone copolymer comprising 70% of vinyl chloride, 30% of isobutyl vinyl ether and having pendant from said backbone of the terpolymer poly(n-butyl acrylate) chains to the extent of 30 parts by weight of the entire terpolymer.

6. The polymer according to claim 3 wherein the R is 2-ethylhexyl vinyl ether and R" is an n-butyl group.

7. The method of forming terpolymers according to claim 1 wherein an aqueous emulsion of an alkyl acrylate, containing a free radical generating catalyst, is added to an aqueous latex of a vinyl ether/vinyl chloride copolymer, mixing said emulsion with said latex, raising the temperature of the mixture above the initiation temperature of the polymerization reaction, maintaining the temperature of said initiated reaction below the boiling point of $H_2O$ until the reaction is substantially completed, cooling mixture and recovering the resultant graft terpolymer latex.

8. The method according to claim 7 wherein the vinyl ether is 2-ethylhexyl vinyl ether and the alkyl acrylate is n-butyl acrylate.

9. The method according to claim 7 wherein the vinyl ether is isobutyl vinyl ether and the alkyl acrylate is n-butyl acrylate.

10. The method according to claim 7 wherein the free radical-generating catalyst is a persulfate catalyst.

11. The method according to claim 9 wherein the reaction mixture is buffered with $Na_2HPO_4$ and sodium hydroxide during the initial reaction of the isobutyl vinyl ether with the vinyl chloride, the pH is then adjusted above pH 7 just prior to the addition of the n-butyl acrylate, and the pH of the latex product adjusted to a pH of about 11 upon completion of the final reaction.

References Cited
UNITED STATES PATENTS

| | | | |
|---|---|---|---|
| 3,290,265 | 12/1966 | Kaneko | 260—29.6 |
| 2,879,256 | 3/1959 | Wooten et al. | 260—884 |
| 2,791,600 | 5/1957 | Schwaegerle | 260—884 |
| 3,254,044 | 5/1966 | Gunderman et al. | 260—29.6 |

MURRAY TILLMAN, Primary Examiner

J. SEIBERT, Assistant Examiner

U.S. Cl. X.R.

117—124 E, 132 C, 148, 155 UA, 161 UZ; 260—29.6 RB, 876 R